United States Patent Office 3,179,614
Patented Apr. 20, 1965

3,179,614
POLYAMIDE-ACIDS, COMPOSITIONS THEREOF, AND PROCESS FOR THEIR PREPARATION
Walter Murray Edwards, Wilmington, Del., assignor to E. I. du Pont de Nemours and Company, Wilmington, Del., a corporation of Delaware
No Drawing. Filed Mar. 13, 1961, Ser. No. 95,014
25 Claims. (Cl. 260—30.2)

This invention relates to novel shapeable polymeric compositions and, more particularly, to the preparation of polyamide-acids and their formation into shaped structures. As used in the present specification, "shapeable" refers to the ability of the polymeric compositions to be shaped into useful structures by extrusion through dies, casting as films, coating on substrates, or by similar processing.

This application is a continuation-in-part of my co-pending application Serial No. 761,968, filed September 19, 1958, now abandoned.

The outstanding physical and chemical properties of certain polymers make them extremely useful in the form of shaped structures such as films, filaments, tubing, etc. However, the same outstanding physical and chemical properties make it extremely difficult to shape these polymers into useful structures. One purpose of the present invention is to provide a group of polymeric compositions having satisfactory physical and chemical properties, but which can easily be formed into shaped structures. A further purpose is to select polymeric compositions which, in the form of shaped structures, can be converted into polymers having even more outstanding physical and chemical properties.

Specifically, the object of the present invention is to provide shapeable compositions of polyamide-acids. A further object is to provide shaped structures of these polyamide-acid compositions. A still further object and important use of the invention is to convert the polyamide-acid structures to structures of polymers having even more desirable properties than the polyamide-acids, e.g. structures of polyimides, polyamide-acid salts, esters of polyamide-acids, etc. Other objects will appear hereinafter.

The objects are accomplished by a composition containing at least one polyamide-acid having the following structural formula:

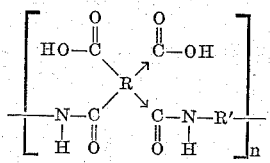

wherein → denotes isomerism [1]; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide a polyamide-acid having an inherent viscosity of at least 0.1, preferably 0.3–5.0, as measured as a 0.5% solution in N,N-dimethylacetamide at 30° C.

The polyamide-acids for use in the composition of the present invention are solids with an undefined melting point. Their infrared absorption spectra are characterized by absorption bands at ca. 3.1 microns due to the N—H bond of the amide groups, at ca. 5.8 microns due to the C=O bond of the carboxyl groups and at ca. 6.0 microns due to the C=O bond of the amide groups.

The process for preparing the polyamide-acid compositions comprises reacting by mixing at least one organic diamine having the structural formula:

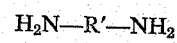

wherein R' is a divalent radical containing at least 2 carbon atoms, the two amino groups of said diamine each attached to separate carbon atoms of said divalent radical; with at least one tetracarboxylic acid dianhydride having the structural formula:

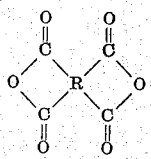

wherein R is an organic tetravalent radical containing at least 2 carbon atoms, no more than 2 carbonyl groups of said dianhydride attached to any one carbon atom of said tetravalent radical; in an organic solvent for at least one reactant, said solvent being inert to the reactants, preferably under anhydrous conditions, for a time, preferably of at least 1 minute, and at a temperature below 175° C., sufficient to provide at least 50% of the corresponding polyamide-acid.

It should be understood that one purpose of the process is to provide a composition that can be shaped into useful objects. For this purpose, it has been found that a composition containing a polymeric component made up of at least 50% of the polyamide-acid will suffice for all combinations of diamine/dianhydride reaction products. However, for polyamide-acids prepared from some combinations of diamine and dianhydride, the polymeric components of shapeable compositions may contain less than the specified minimum of 50%.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions, the polymeric portion of which contains at least 50% of the polyamide-acid. The particular temperature below 175° C. that must not be exceeded for any particular combination of diamine, dianhydride, solvent and reaction time to provide a reaction product composed of at least 50% of the polyamide-acid will vary but can be determined by a simple test by any person of ordinary skill in the art. However, to obtain the maximum inherent viscosity, i.e. maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

After shaping the composition composed predominantly of the polyamide-acid, preferably still in the solvent, into a useful article, e.g. filament, film, tube, rod, etc., and drying the article, it is preferred to convert the polyamide-acid to another polymer to modify the properties of the shaped structure. Thus, the polyamide-acid may be converted by heat treatment or chemical treatment to ---
[1] In any recurring unit the groups to which arrows point may exist in the polymeric structure as shown or these groups may exist in interchanged positions.

the corresponding polyimide such as disclosed and claimed in copending applications Serial No. 803,349 and Serial No. 803,348, respectively, both forfeited after allowance. The polyamide-acid may also be converted to any of its salts or esters by conventional techniques.

Instead of shaping the polyamide-acid composition into the usual articles, the polyamide-acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc.

A preferred process involves premixing equimolar amounts of the diamine and the dianhydride as dry solids and then adding the mixture, in small portions and with agitation, to the organic solvent. Premixing the ingredients and then adding them in small portions to the solvent provides relatively simple means for controlling the temperature and the rate of the process. Since, as mentioned previously, the reaction is exothermic and tends to accelerate very rapidly, it is important to regulate the additions to maintain the reaction temperature below the predetermined value, the value being such as to prevent the formation of a polymeric component containing less than 50% of the polyamide-acid. However, the order of addition may be varied within the scope of the present invention. After premixing the diamine and the dianhydride, the solvent may be added to the mixture with agitation. It is also possible to dissolve the diamine in the organic solvent, while agitating and preheating the solution to an elevated temperature below or at the predetermined maximum, and then to add the dianhydride at a rate sufficient to control the ultimate maximum reaction temperature. Ordinarily, in this latter process the last portion of the dianhydride is added with part of the organic solvent. Another possible method involves adding the reactants to the solvent in small portions, not as a premixture, but alternately; first diamine, then dianhydride, then diamine, etc. In any event, it is advisable to agitate the solution polymerization system after the additions are completed until maximum viscosity denoting maximum polymerization is obtained. Another preferred process comprises dissolving the diamine reagent in one portion of a solvent and the dianhydride reagent in a second portion of the same or another solvent, and mixing the two solutions.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. However, the scope of the present process encompasses the use of up to 5% excess of either the diamine or the dianhydride. More than 5% excess of either reactant results in an undesirably low molecular weight polyamide-acid. For some purposes, it is desirable to use 1–3% excess of either reactant, preferably the dianhydride. Besides using an excess of one reactant to limit the molecular weight of the polyamide-acid, a chain terminating agent such as phthalic anhydride may be used to "cap" the ends of the polymer chains.

In the preparation of the shapeable compositions of the present invention it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent. The suitable solvent for the purpose of the present invention has been chosen as N,N-dimethylacetamide. However, it should be understood that any other solvent could have been chosen to provide duplicatable results. The viscosity of the polymer solution is measured relative to that of the solvent alone and the Inherent viscosity =
$$\frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The desirable viscosity is obtained by the reaction of the diamine and the dianhydride under the aforementioned controlled conditions. The viscosity should be such that the polymer solution does not flow uncontrollably. The resulting composition is then dried.

The quantity of organic solvent used in the process of the invention need only be sufficient to dissolve enough of one reactant, preferably the diamine, to initiate reaction of the diamine and the dianhydride. For forming the composition into shaped articles, it has been found that the most successful results are obtained when the solvent represents at least 60% of the final polymeric solution. That is, the solution should contain 0.05–40% of the polymeric component. After formation, the polyamide-acid may be isolated in a stable form by precipitating in a non-solvent for the polyamide-acid such as cyclohexane, dioxane, benzene, etc. However, the viscous solution of the polymeric composition in the organic polar solvent may be used as such for forming shaped structures or as a coating.

The starting materials for forming the products of the present invention are organic diamines and tetracarboxylic acid dianhydrides. The organic diamines are characterized by the formula: $H_2N—R'—NH_2$, wherein $R'$, the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorous, and substituted groups thereof. The most useful diamines are the primary diamines. Although secondary diamines such as piperazine may be used to produce the polyamide-acid compositions of the present invention, only the primary diamines, upon reaction with the dianhydrides, provide polyamide-acids which after shaping may be converted into the polyimides. The preferred $R'$ groups in the diamines are those containing at least 6 carbon atoms characterized by benzenoid unsaturation, i.e. alternate double bonds in a ring structure. Among the diamines which are suitable for use in the present invention are: meta-phenylene diamine; para-phenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl)diethyl silane; bis-(4-amino-phenyl)phosphine oxide; bis-(4-aminophenyl)-N-methylamine; 1,5-diamino-naphthalene; 3,3'-dimethyl-4,4'-diamino-biphenyl; 3,3'-dimethoxy benzidine; 2,4-bis-(beta-amino-t-butyl)toluene; bis-(para-beta-amino-t-butyl-phenyl) ether; para-bis-(2-methyl-4-amino-pentyl)benzene; para-bis-(1,1-dimethyl-5-amino-pentyl)benzene; m-xylylene diamine; p-xylylene diamine; bis(para-amino-cyclohexyl)methane; hexamethylene diamine; heptamethylene diamine; octamethylene diamine; nonamethylene diamine; decamethylene diamine; 3-methylheptamethylene diamine; 4,4-dimethylheptamethylene diamine; 2,11- diamino-docecane; 1,2 - bis-(3-amino - propoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane; 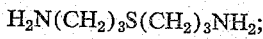

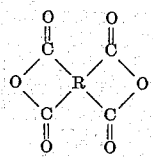

$H_2N(CH_2)_3N(CH_3)(CH_2)_3NH_2$; and mixtures thereof.

The tetracarboxylic acid dianhydrides are characterized by the following formula:

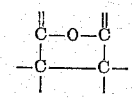

wherein R is a tetravalent organic radical selected from the group consisting of aromatic, aliphatic, cycloaliphatic, heterocyclic, combination of aromatic and aliphatic, and subtsituted groups thereof. However, the preferred dianhydrides are those in which the R groups have at least 6 carbon atoms characterized by benzenoid unsaturation, i.e. alternate double bonds in a ring structure, wherein the 4 carbonyl groups of the dianhydride are each attached to separate carbon atoms and wherein each pair of carbonyl groups is directly attached to adjacent carbon atoms in the R group to provide a 5-membered ring as follows:

```
    O       O
    ‖       ‖
    C—O—C
    |       |
   —C———C—
    |       |
```

The preferred dianhydrides, as recited above, yield upon reaction with the diamines polyamide-acid structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; etc.

The solvents useful in the solution polymerization process for synthesizing the polyamide-acid compositions of the present invention are the organic solvents whose functional groups do not react with either of the reactants (the diamines or the dianhydrides) to a greater extent than the reactants do with each other. Besides being inert to the system and, preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

This invention will be more clearly understood by referring to the examples which follow. These examples, which illustrate specific embodiments of the present invention, should not be construed to limit the invention in any way. In the examples the quantities of reactants used in preparing the shapeable polymeric compositions are given in molar amounts and the concentration of the compositions in the solvent is given in weight percent. For convenience, abbreviations will be used wherever possible. Thus, MPD represents meta-phenylene diamine; MXD, meta xylylene diamine; PPD, para-phenylene diamine; DDD, 2,11-diamino-dodecane; DDP, 4,4'-diamino diphenyl propane or 2,2-bis(4-amino phenyl) propane; DDM, 4,4'-diamino diphenyl methane or bis(4-amino phenyl) methane; PP, benzidine; POP 4,4'-diamino-diphenyl ether; PSP, 4,4'-diamino-diphenyl sulfide; $PSO_2P$, 4,4'-diamino-diphenyl sulfone or bis(4-amino-phenyl) sulfone; HMD, hexamethylene diamine; DMHMD, 4,4-dimethylheptamethylene diamine; APDS, bis(4-aminophenyl) diethyl silane; APPO, bis-(4-amino-phenyl) phosphine oxide; APAA, bis-(4-amino-phenyl)-N-methyl amine; DP, 2,6-diamino-pyridine; DAC, 1,4-diamino-cyclohexane; PMDA, pyromellitic dianhydride; PAP, 2,2-bis-(3,4-dicarboxyl phenyl) propane dianhydride; CPTA, 1,2,3,4 - cyclopentane tetracarboxylic dianhydride; $PSO_2DA$, 3,4-dicarboxyphenyl sulfone dianhydride; PTDA, 2,3,5,6-pyrazine tetracarboxylic dianhydride; PEDA, bis-(3,4-dicarboxyphenyl) ether dianhydride; DMF, N,N-dimethylformamide; DMA, N,N-dimethylacetamide; NMCL, N-methylcaprolactam; DMS, dimethyl sulfoxide and P, pyridine.

The following illustration is typical of the reactions in the examples and should serve as a guide to the polyamide-acid obtained in each example. The reactions in this illustration involves para-phenylene diamine (PPD) and pyromellitic dianhydride (PMDA).

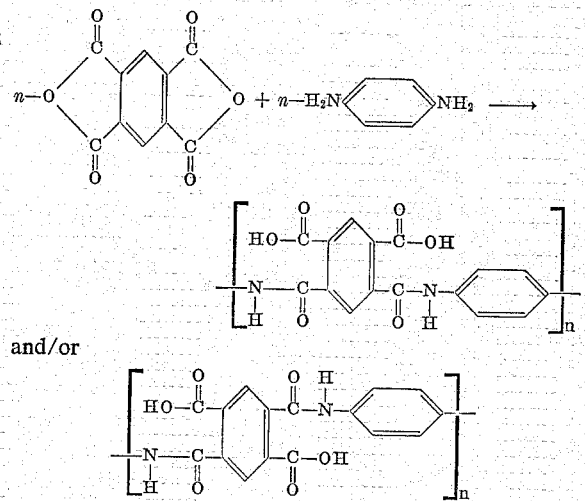

and/or

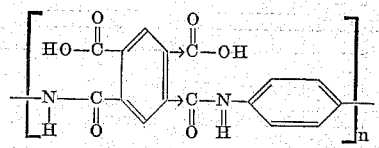

The fact that the carboxyl groups on each recurring unit may be meta or para to each other, as shown above, indicates the isomeric nature of the recurring unit. This isomerism is depicted most simply by the arrows in the following structural formula of the polyamide-acid product;

In the examples, the polyamide-acid compositions were prepared by reacting at least one diamine with a dianhydride in the presence of N,N-dimethylacetamide, N,N-dimethylformamide, pyridine, N-methylcaprolactam or dimethyl sulfoxide as solvents. The reactions, unless otherwise stated, were carried out under a dry nitrogen atmosphere. The temperature of the reaction in most of the examples (particularly Examples 1–32) was not permitted to rise above 50° C.

The presence of the polymer, the polyamide-acid, in the final composition was determined by infrared absorption spectra. The appearance of bands representing —NH and —COOH groups and the lack of bands representing anhydride and free amino groups served to characterize the polyamide-acids.

The examples are summarized in Table I. The details of the examples, where some of the compositions are shaped into useful structures such as films and filaments, follow the table.

The preparations of some of the important ingredients used in the examples are given below:

The meta-phenylene diamine used was colorless and had a melting point of 62–63° C. It was prepared by first bubbling air through a melt of the commercially available product followed by fractional distillation.

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide were prepared by fractional distillation from phosphorous pentoxide; the fraction distilling at 47.5° C. and 17 mm. pressure being N,N-dimethylformamide and the fraction distilling at 73° C. and 30 mm. pressure being N,N-dimethylacetamide.

EXAMPLE 1

12.4 grams (0.115 mole) of metaphenylene diamine was dissolved in 100 milliliters N,N-dimethylacetamide. Pyromellitic dianhydride, 25.0 grams (0.115 mole) was added portion-wise with agitation. During the entire operation (approximately 40 minutes) the reaction vessel was cooled by tap water (approximately 15° C.) circulating through an outer jacket. The last portion of dianhydride was added with 15 milliliters N,N-dimethylacetamide, then an additional 85 milliliters of N,N-dimethylacetamide was added to give a viscous solution containing 15.4% by weight polymer. The inherent viscosity of the polyamide-acid was 1.7 (as measured as a 0.5% solution in N,N-dimethylacetamide at 30° C.). The viscous solution was cast onto a glass plate and dried at 120° C. in a forced-draft oven for about 60 minutes. A tough, flexible polyamide-acid film was obtained.

EXAMPLE 2

A polyamide-acid from para-phenylene diamine and pyromellitic dianhydride was prepared following the procedure described in Example 1. 6.2 grams (.0575 mole) of the diamine, 12.5 grams (.0575 mole) of the anhydride and 120 milliliters of N,N-dimethylacetamide were used. The viscous solution containing 12.8% by weight of the polymer was cast onto a glass plate to form a tough, flexible polyamide-acid film.

EXAMPLE 3

Benzidine, 2.01 grams (0.011 mole), was dissolved in 10 milliliters of N,N-dimethylformamide. Pyromellitic dianhydride, 2.37 grams (0.011 mole), was added portion-wise with stirring. During addition, the solution was diluted by adding 10 milliliters of N,N-dimethylformamide at three separate times. With the last portion of dianhy- Table I

SUMMARY OF EXAMPLES 1–36

| Example | Moles diamine | Moles dianhydride | Weight percent polymer in solvent | Inherent viscosity of polymer |
|---|---|---|---|---|
| 1 | .115 MPD | .115 PMDA | 15.4% in DMA | 1.7 |
| 2 | .0575 PPD | .0575 PMDA | 12.8% in DMA | 1.8 |
| 3 | .011 PP | .011 PMDA | 8.1% in DMF | 2.0 |
| 4 | .0575 MPD / .0286 PPD / .0286 PP | .115 PMDA | 12.7% in DMF | 2.45 |
| 5 | .046 DDM | .046 PMDA | 17.6% in DMF | 1.4 |
| 6 | .0575 MPD / .0575 DDM | .115 PMDA | 17% in DMF/P[a] | 2.0 |
| 7 | .026 MPD | .0263 PMDA | 23% in DMF | 0.6 |
| 8 | .0151 DDM | .0151 PMDA | 11.7% in DMF | 1.4 |
| 9 | .0065 MPD / .0065 HMD | .01304 PMDA | 12% in DMF[a] | 0.34 |
| 10 | .010 DDM / .00325 HMD | .01325 PMDA | 14.5% in DMF[a] | 0.44 |
| 11 | .0208 MPD | .0208 PMDA | 5% in DMF | >0.3 |
| 12 | .0354 MPD[b] | .0354 PMDA[c] | 7.5% in DMA | >0.3 |
| 13 | .0213 MPD | .0213 PAP | 15% in DMF | >0.3 |
| 14 | .00536 PP | .00536 PAP | 7.5% in DMA | >0.3 |
| 15 | .0206 MXD | .0206 PMDA | 8% in DMA[a] | 0.36 |
| 16 | .0153 DDD | .0153 PMDA | 5% in DMA[a] | 0.32 |
| 17 | .0229 HMD | .0229 PMDA | 5% in DMF | 0.45 |
| 18 | .0687 DMHMD | .0687 PMDA | 20% in DMF | 0.80 |
| 19 | .0212 POP | .0212 PMDA | 5% in DMA[a] | 4.5 |
| 20 | .0065 POP | .0065 PAP | 6.5% in P[a] | >0.3 |
| 21 | .05 DDM | .05 PMDA | 10.5% in DMF | 1.70 |
| 22 | .05 MPD | .05 PMDA | 14% in DMF[a] | 1.15 |
| 23 | .0572 MPD | .0572 PMDA | 22.1% in DMS | 0.81 |
| 24 | .0462 PSP | .0465 PMDA | 13.8% in DMF/P[a] | 1.44 |
| 25 | .0455 PSO₂P | .0458 PMDA | 23.2% in DMF | 0.72 |
| 26 | .0199 POP | .0199 PMDA | 10% in DMA | 1.1 |
| 27 | .011 DP | .011 PMDA | 8% in DMA[a] | >0.1 |
| 28 | .011 DAC | .011 PMDA | 8% in DMA[a] | >0.1 |
| 29 | .011 APDS | .011 PMDA | 8% in DMA[a] | >0.1 |
| 30 | .011 APPO | .011 PMDA | 8% in DMA[a] | >0.1 |
| 31 | .011 APMA | .011 PMDA | 8% in DMA[a] | >0.1 |
| 32 | .05 MPD | .05 CPTA | 8% in DMA[a] | >0.1 |
| 33 | .035 PSP | .035 PSO₂DA | 11% in DMA[a] | 0.85 |
| 34 | .05 POP | .05 PTDA | 3% in DMA[a] | >0.1 |
| 35 | .0035 POP | .0035 PEDA | 5% in DMA[a] | 0.74 |
| 36 | .1 POP | .1 PMDA | 10% in DMA[a] | (d) |

[a] Approximately.
[b] Excess of 0.25 mole percent MPD used.
[c] .020 gram phthalic anhydride added with dianhydride.
[d] Varied as shown in table accompanying Example 36.

dride was added 10 milliliters of N,N-dimethylformamide to give a viscous casting solution containing 8.1% by weight of polymer. The reaction was carried out at a temperature maintained at 15° C. It was allowed to continue for approximately 45 minutes, at which time a noticeable increase in viscosity indicated substantial completion of the reaction. Tough polyamide-acid films were made by casting the solution onto glass plates by drying at 80° C. in a vacuum for 60 minutes. The inherent viscosity of the polyamide-acid was 2.0 (as measured as 0.5% solution in N,N-dimethylformamide at 30° C.).

EXAMPLE 4

Metaphenylene diamine, 6.2 grams (0.0575 mole), 3.1 grams (0.0286 mole) of paraphenylene diamine, 5.28 grams (0.0286 mole) of benzidine and 25.0 grams (0.115 mole) of pyromellitic dianhydride were weighed, mixed and added portion-wise into 100 milliliters N,N-dimethylformamide with agitation. The reaction was allowed to continue for approximately 45 minutes. A noticeable increase in viscosity indicated that the reaction was substantially complete. The reaction vessel was cooled by water (approximately 15° C.) circulating through an outer jacket. As the viscosity increased, the solution was gradually diluted with 185 milliliters of additional N,N-dimethylformamide. A casting solution, containing 12.7% by weight polymer, was obtained. The inherent viscosity of the polyamide-acid was 2.45. Tough polyamide-acid films were obtained by casting the solution onto glass plates and drying at 120° C.

EXAMPLE 5

The polyamide-acid of 2,2-bis(4-aminophenyl)propane and pyromellitic dianhydride was prepared as follows:

10.35 grams (0.046 mole) of the diamine was dissolved in 40 milliliters N,N-dimethylformamide. Pyromellitic dianhydride, 10.0 grams (0.046 mole) was added portion-wise with agitation while the solution was cooled with water (approximately 15° C.) circulating through an outer jacket. The reaction was allowed to continue for approximately 60 minutes and was considered substantially complete as evidenced by the noticeable increase in viscosity. As the viscosity increased, 16 milliliters of N,N-dimethylformamide was added portion-wise to yield a casting solution containing 71.6% polymer by weight. The inherent viscosity of the polyamide-acid was 1.4. Tough films of the polyamide-acid were obtained by casting the solution onto glass plates and drying at 120° C.

EXAMPLE 6

The polyamide-acid of metaphenylene diamine, bis-(4-aminophenyl)methane and pyromellitic dianhydride was prepared as follows:

6.2 grams (0.0575 mole) of metaphenylene diamine, 11.4 grams (0.0575 mole) of bis(4-aminophenyl)methane and 25.0 grams (0.115 mole) of pyromellitic dianhydride were weighed, mixed and added portion-wise into 100 milliliters of N,N-dimethylformamide. The reaction was allowed to continue for approximately 50 minutes and was considered substantially complete as evidenced by the noticeable increase in viscosity. The reaction vessel was cooled by water (approximately 15° C.) circulating through an outer jacket. As the viscosity of the solution increased, it was diluted with additional N,N-dimethylformamide and pyridine to give a final casting solution containing 42.6 grams polymer, 190 milliliters N,N-dimethylformamide and 126 milliliters pyridine (approximately 17% polymer by weight). The inherent viscosity of the polyamide-acid was 2.0. Tough films of the polyamide-acid were obtained by casting the solution onto glass plates and drying at 120° C.

EXAMPLE 7

Metaphenylene diamine, 2.82 grams (0.026 mole) was dissolved in 30 milliliters of N,N-dimethylformamide. Pyromellitic dianhydride, 5.7 grams (0.026 mole) plus a small excess (1 molar percent) was added portion-wise with agitation. During the polymerization (approximately 60 minutes) the reaction vesssel was cooled by tap water (approximately 15° C.) circulating through an outer jacket. The polymerization was considered to be substantially complete as indicated by the perceptible increase in viscosity. A solution containing 23% polymer by weight was obtained. The viscous solution was cast onto a glass plate with a doctor knife having 15 mil opening and was dried in a vacuum at 60° C. for 60 minutes. The film was stripped from the glass plate and dried additionally for 15 hours at room temperature under a dry nitrogen atmosphere. The inherent viscosity was 0.6 (as measured as a 0.5% solution of the film in 97/3 N,N-dimethylformamide/lithium chloride at 30° C.).

The resultant polyamide-acid film displayed the following properties:

Tensile modulus (p.s.i.) _____ 400,000
Elongation (percent) _____ 3.6
Tensile strength (p.s.i.) _____ 7,400

EXAMPLE 8

Bis(4-amino phenyl)methane, 3.0 grams (0.0151 mole) was dissolved initially in 25 milliliters of N,N-dimethylformamide. Pyromellitic dianhydride, 3.3 grams (0.0151 mole) was added portion-wise with agitation. During the entire operation (approximately 30 minutes) the reaction vessel was cooled by tap water (about 15° C.) circulating through the outer jacket. The last portion of dianhydride was added with 25 milliliters of N,N-dimethylformamide, to give a resultant viscous solution containing 11.7% by weight polymer. As in the previous example, the film was cast onto a glass plate with a 15 mil doctor knife opening and dried in vacuum at 70° C. for 60 minutes. The film was strpped from the glass plate and dried for an additional 15 hours at room temperature under a dry nitrogen blanket. The inherent viscosity was 1.4 (as measured at 0.5% solution of the film in 97/3 N,N-dimethylformamide/lithium chloride at 30° C.).

The resultant polyamide-acid film displayed the following properties:

Tensile modulus (p.s.i.) _____ 570,000
Elongation (percent) _____ 4.5
Tensile strength (p.s.i.) _____ 9,300

EXAMPLE 9

Metaphenylene diamine, 0.7 gram (0.0065 mole) and 0.75 gram (0.0065 mole) hexamethylene diamine were dissolved in 30 milliliters of N,N-dimethylformamide. Pyromellitic dianhydride, 2.84 grams (0.01304 mole) was added portion-wise with agitation. During the polymerization (approximately 60 minutes) the reaction vessel was cooled by tap water (approximately 15° C.) circulating through an outer jacket. The polymerization was considered to be substantially complete as indicated by the perceptible increase in viscosity. A solution containing approximately 12% polymer by weight was obtained. The viscous solution was cast onto a glass plate with a doctor knife having 15 mil opening and was dried in a vacuum at 60° C. for 60 minutes. The film was stripped from the glass plate and dried additionally for 15 hours at room temperature under a dry nitrogen atmosphere. The inherent viscosity was 0.34 (as measured as a 0.5% solution of the film in 97/3 N,N-dimethylformamide/lithium chloride at 30° C.).

The resultant polyamide-acid film displayed the following properties:

Tensile modulus (p.s.i.) _____ 229,000
Elongation (percent) _____ 0.9
Tensile strength (p.s.i.) _____ 2,100

EXAMPLE 10

4,4'-diamino diphenyl methane, 1.98 grams (0.010 mole) and 0.38 gram (0.00325 mole) hexamethylene diamine were dissolved in 30 milliliters of N,N-dimethylformamide. Pyromellitic dianhydride, 2.87 grams (0.01325 mole) was added portion-wise with agitation. During the polymerization (approximately 60 minutes) the reaction vessel was cooled by tap water (approximately 15° C.) circulating through an outer jacket. The polymerization was considered to be substantially complete as indicated by the perceptible increase in viscosity. A solution containing approximately 14.5% polymer by weight was obtained. The viscous solution was cast onto a glass plate with a doctor knife having 15 mil opening and was dried in a vacuum at 60° C. for 60 minutes. The film was stripped from the glass plate and dried additionally for 15 hours at room temperature under a dry nitrogen atmosphere. The inherent viscosity was 0.44 (as measured as a 0.5% solution of the film in 97/3 N,N-dimethylformamide/lithium chloride at 30° C.).

The resultant polyamide-acid film displayed the following properties:

| | |
|---|---|
| Tensile modulus (p.s.i.) | 402,000 |
| Elongation (percent) | 11.3 |
| Tensile strength (p.s.i.) | 8,300 |

EXAMPLE 11

Equal molar quantities of metaphenylene diamine (.0208 mole) and pyromellitic dianhydride (.0208 mole) were weighed into a tared reaction vessel equipped with a three-pronged propeller-type stirrer. Enough N,N-dimethylformamide was added to provide a concentration of 5% polyamide-acid. The mixture was stirred at room temperature (approximately 23° C.) until all of the monomers dissolved and the solution reached maximum viscosity; this required from 1 to 2 hours. The temperature of the system during reaction did not rise more than 5–10° C. A viscous, colorless solution of the polyamide-acid was obtained. The polyamide-acid had an inherent viscosity greater than 0.3.

EXAMPLE 12

The procedure of Example 11 was repeated using .0354 mole plus 0.25 mole percent methaphenylene diamine and .0354 mole pyromellitic dianhydride along with .020 gram of phthalic anhydride as a chain terminator to "cap" the polymer chains with neutral terminal groups and using N,N-dimethylacetamide as the solvent. A viscous solution containing 7.5% of the polyamide-acid was obtained.

EXAMPLE 13

The procedure of Example 11 was repeated using .0213 mole of metaphenylene diamine and .0213 mole of 2,2-bis(3,4-dicarboxyl phenyl) propane dianhydride using N,N-dimethylformamide as the solvent. A colorless, viscous solution containing 15% of the polyamide-acid was obtained.

EXAMPLE 14

The procedure of Example 11 was repeated using .00536 mole of benzidine and .00536 mole of 2,2-bis(3,4-dicarboxyl phenyl) propane dianhydride using N,N-dimethylacetamide as the solvent. A colorless, very viscous solution containing 7.5% of the polyamide-acid was obtained.

EXAMPLE 15

In an inert atmosphere, 2.8057 grams (0.0206 mole) of meta-xylylene diamine (boiling point 90° C. at 1–2 mm. mercury), 4.4934 grams (0.0206 mole) of pyromellitic dianhydride (sublimed through silica gel) and 82 milliliters of N,N-dimethyl acetamide (water content 0.01%) were placed in a 250 milliliter round bottom flask. The apparatus was equipped with a motor driven Trubore stirrer and an ice bath. Upon stirring a heavy white precipitate formed which gradually dissolved. Stirring for two hours gave a colorless solution containing about 8% by weight of the polyamide-acid. The inherent viscosity of the polyamide-acid was 0.36 (in N,N-dimethylacetamide at about 0.5%).

Films were prepared by casting the polyamide-acid solution on a silicone-treated glass plate and drying under a nitrogen stream.

EXAMPLE 16

In an inert atmosphere, 3.1261 grams (0.0153 mole) of 2,11-dodecanediamine, 3.3361 grams (0.0153 mole) of pyromellitic dianhydride (sublimed through silica gel) and 113 milliliters of N,N-dimethylacetamide (water content 0.01%) were placed in a 250 milliliter round bottom flask. The apparatus was equipped with a motor driven Trubore stirrer and an ice bath. Upon stirring a heavy white precipitate formed which gradually dissolved. Stirring for two hours gave a colorless solution containing about 5% of the polyamide-acid. The polymer had an inherent viscosity (in N,N-dimethylacetamide at 0.5% concentration) of 0.32.

Polyamide-acid films were prepared by casting the above solution on a silicone-treated glass plate and drying under a nitrogen stream.

EXAMPLE 17

In an inert atmosphere, dry nitrogen, 2.66 grams (0.0229 mole) of hexamethylene diamine was dissolved in approximately 126 milliliters of N,N-dimethylformamide, stirred for 5 to 10 minutes to ensure dissolution. The temperature was reduced to 11° C. and maintained by the cold water circulating in the outer jacket of the reaction vessel. Powdered pyromellitic dianhydride, 5.00 grams (0.0229 mole) was added portion-wise. The last portion of the pyromellitic dianhydride was added as a slurry in an additional 30 milliliters of N,N-dimethylformamide. A total time of approximately 5 minutes had elapsed through the addition of the pyromellitic dianhydride. Stirring was vigorous and within 2–3 minutes the entire contents of the reaction vessel appeared to slush into a salt-like white precipitate. With vigorous stirring for approximately 5 minutes the entire precipitate dissolved. The stirring was continued for a total time of 1 hour while the reaction vessel was cooled with the tap water at 11° C. A sparkling clear solution was obtained (faint yellow color) and contained 5.0% by weight, polymer. The inherent viscosity of the polyamide-acid was 0.45 (as measured as a 0.5% solution of N,N-dimethylformamide). The solution was cast onto a glass plate and the solvent removed at 100–120° C. for 10–15 minutes. A sparkling clear, tough, flexible polyamide-acid film was obtained.

EXAMPLE 18

Following the procedure of Example 17, 10.86 grams (0.0687 mole) of 4,4-dimethylheptamethylene diamine was dissolved in 60 milliliters of N,N-dimethylformamide in the reaction vessel cooled by water, maintained at 11–12° C., circulating through an outer jacket. Powdered pyromellitic dianhydride, 15.0 grams (0.0687 mole) was added portion-wise to the reaction vessel. The last portion of the pyromellitic dianhydride was added as a slurry with an additional 15 milliliters of N,N-dimethylformamide. The additions took place over approximately 2–3 minutes. Within 1–2 minutes after the completion of the addition of the pyromellitic dianhydride, the entire system set up as a slurry and thickened noticeably. The stirring was increased and within 10–15 minutes the slush was substantially dissolved. The total time of agitation was one hour and 15 minutes at which time a viscous clear solution had been obtained containing 20.0%, by weight, polymer. The inherent viscosity was 0.80. The viscous solution was cast onto a glass plate using a doctor knife with a 10 mil opening and gave a tough, flexible, clear polyamide-acid film after 10–15 minutes drying at 110–120° C.

EXAMPLE 19

In a nitrogen atmosphere, 4.2543 grams (0.0212 mole) of bis(p-amino-phenyl) ether and 4.6363 grams (0.0212 mole) of pyromellitic dianhydride were placed in a 250 millilites beaker. 169 milliliters of N,N-dimethylacetamide was added with stirring. The reaction was conducted at room temperature (23° C.) and during the reaction the temperature did not rise more than 5–10° C. Stirring for three hours gave a light yellow viscous solution containing about 5% by weight of the polyamide-acid. Inherent viscosity of the polyamide-acid by dilution to 0.1% solids in N,N-dimethylacetamide was 4.5. Polyamide-acid films were obtained by casting the solution on glass plates.

EXAMPLE 20

In a nitrogen atmosphere, 2.1810 grams (0.0065 mole) of 2,2-bis (3,4-dicarboxyphenyl) propane dianhydride was added in small portions with stirring, over a period of ten minutes, to a solution of 1.2954 grams (0.0065 mole) of bis(p-aminophenyl) ether in 18 milliliters of anhydrous pyridine. An additional 30 milliliters of pyridine was added to the reaction mixture. The addition of dianhydride produced a bright yellow color which gradually disappeared. The reaction was conducted at room temperature (23° C.) and during the reaction the temperature did not rise more than 5–10° C. The resulting solution, containing about 6.5% by weight of the polyamide-acid, was slightly yellow and viscous. The inherent viscosity of the polyamide-acid was greater than 0.3. A tough transparent film of a polyamide-acid was obtained by casting the solution on a glass plate.

EXAMPLE 21

A polyamide-acid was prepared from 4,4'-diaminodiphenylmethane and pyromellitic dianhydride as follows:

In a three-necked 250 cc. round-bottomed flask equipped with stirrer, addition funnel, and nitrogen inlet tube were placed 9.91 grams (0.05 mole) 4,4'-diaminodiphenylmethane and 10.91 grams (0.05 mole) pyromellitic dianhydride which had been sublimed through a silica gel onto a stainless steel screen. The stirrer was started and 83.3 grams N,N-dimethylformamide which had been distilled from pyromellitic dianhydride was added to give a polyamide-acid solution. The reaction was conducted at room temperature (23° C.) and during the reaction the temperature did not rise more than 5–10° C. The resulting polyamide-acid was found to have an inherent viscosity of 1.70.

To the solution prepared as above was added 83 cc. N,N-dimethylformamide and the solution, containing 10.5% by weight of the polyamide-acid, was then spun through a flat-faced spinneret having five holes, each 0.005 inches in diameter, into a water bath at room temperature. The fibers were stretched to twice their original lengths immediately following the coagulating bath and were wound up at 27 yards/minute. After air-drying, the poyamide-acid fibers were found to have a tenacity of 1.1 grams/denier, an elongation of 6.5% and an initial tensile modulus of 44 grams/denier.

EXAMPLE 22

Following the procedure of Example 21, a polyamide-acid was prepared from 5.41 grams (0.05 mole) meta-phenylene diamine, 10.91 grams (0.05 mole) promellitic dianhydride, and 100 cc. N,N-dimethylformamide. After stirring overnight, a clear viscous solution of polyamide-acid was obtained having an inherent viscosity of 1.15.

The solution was prepared above, containing about 14% by weight of the polymer, was spun through a stainless steel spinneret into a room temperature coagulating bath consisting of 20 parts N,N-dimethylformamide and 80 parts water. The fiber was drawn 2.7 times its original length immediately after spinning. The dried polyamide-acid fiber was found to have a tenacity of 2.5 grams/denier and on elongation of 40%.

EXAMPLE 23

Methaphenylene diamine, 6.20 grams (0.0572 mole), was dissolved in 50 milliliters of dimethylsulfoxide. Pyromellitic dianhydride, 12.50 grams (0.0572 mole), was added portion-wise with stirring. During the entire operation the reaction vessel was cooled by tap water (approximately 15° C.) circulating through an outer jacket. The last trace of pyromellitic dianhydride was added with 10 milliliters of dimethylsulfoxide, and then at the completion of the polymerization, an additional 10 milliliters of dimethylsulfoxide was added to give a viscous solution containing 22.1% polymer by weight. The inherent viscosity of the polyamide-acid was 0.81 (as measured in a 0.5% solution in dimethylsulfoxide at 30° C.). The viscous solution was cast onto a glass plate with a doctor knife having a 10 mil opening and dried at 80° C. for 90 minutes in a vacuum. A tough, flexible polyamide-acid film was obtained.

EXAMPLE 24

4,4'-diamino diphenyl sulfide, 10.0 grams (0.0462 mole) and 10.15 grams (0.0465 mole) of pyromellitic dianhydride were weighed, mixed, and added portion-wise into 80 milliliters of 1/1 N,N-dimethylformamide/pyridine solvent with agitation, over a period of 1 hour. During the reaction, the vessel is externally cooled by circulating water through an outer jacket (at approximately 15° C.). During the additions, 40 milliliters of the solvent mixture was added to maintain a desired viscosity level. The last portion of the reactants was added in 10 milliliters of the solvent and stirred additionally for 30 minutes. A viscous casting solution was obtained containing 13.8% by weight of polymer. The inherent viscosity of the polyamide-acid was 1.44 (as measured as a 0.5% solution in 1/1 N,N-dimethylformamide/pyridine at 30° C.). The viscous solution was cast onto a glass plate with a doctor knife having a 15 mil opening and dried at 120° C. for 15 minutes in a force draft oven. A tough, flexible polyamide-acid film was obtained. The inherent viscosity was 1.2 (as measured as a 0.5% solution of the film in N,N-dimethylformamide at 30° C.).

EXAMPLE 25

Bis(4-amino phenyl) sulfone, 11.3 grams (0.0455 mole) and 10.0 grams (0.0458 mole) of pyromellitic dianhydride were weighed, mixed and added portion-wise into 60 milliliters of N,N-dimethylformamide, with stirring, over a period of 1 hour. The last portion of the reactants was added with 5 milliliters of N,N-dimethylformamide. The reaction was allowed to proceed for 24 hours; during the entire time interval, the reaction vessel was cooled externally with circulating water (at approximately 15° C.). Another 5 milliliters of N,N-dimethylformamide was added, with the last traces of reactants after 20 hours. Another 5 milliliters of N,N-dimethylformamide was added and a viscous casting solution was obtained, containing 23.2% by weight of polymer. The inherent viscosity of the polyamide-acid was 0.72 (as measured as a 0.5% solution in N,N-dimethylformamide at 30° C.). The viscous solution was cast onto a glass plate with a doctor knife having a 10 mil opening and dried for 7–8 minutes at 120° C. in a force draft oven. A tough, clear, colorless, flexible film was obtained. The inherent viscosity was 0.43 (as measured as a 0.5% solution of the film in N,N-dimethylformamide at 30° C.).

EXAMPLE 26

In a nitrogen atmosphere, 4.0000 grams (0.0199 mole) of 4,4'-diamino diphenyl ether and 4.3400 grams (0.0199 mole) of pyromellitic dianhydride were placed in a 250 milliliter flask equipped with mechanical stirrer. 47.2 grams of N,N-dimethylacetamide was added with stirring as the mixture was maintained under a nitrogen atmosphere. The reaction was conducted at room temperature (23° C.) and stirring was continued for three hours. 27.9 grams of N,N-dimethylacetamide was added to the viscous solution to give a 10% by weight polyamide-acid solution. The inherent viscosity of the polyamide-acid by dilution to 0.5% solids in N,N-dimethylacetamide was 1.1. Polyamide-acid films were cast on copper, aluminum, Bonderite, steel, and glass panels with a doctor knife having a 10 mil opening. The films were dried at room temperature (23° C.) for 48 hours; the dried coating thickness was 0.5 mil. Adhesion of these films to the copper, aluminum, steel and glass was good and fair adhesion was observed on the Bonderite.

EXAMPLES 27–31

When the procedure of Example 3 is repeated using 2,6-diamino-pyridine, 1,4-diamino-cyclohexane, bis-(4-amino-phenyl) diethyl silane, bis-(4-amino-phenyl) phosphine oxide, and bis-(4-amino-phenyl)-N-methylamine individually in molar amounts equal to the dianhydride, the corresponding polyamide-acid is obtained in each case. The inherent viscosity of each polyamide-acid is greater than 0.1 (as measured as a 0.5% solution in N,N-dimethylacetamide at 30° C.). Tough polyamide-acid films were made from these by casting onto glass plates and drying under vacuum at 50° C. instead of 80° C.

EXAMPLE 32

Equimolar amounts (0.05 mole) of 1,2,3,4-cyclopentane tetracarboxylic anhydride and metaphenylene diamine were weighed into a reaction vessel with nitrogen. Dry nitrogen was passed slowly through the flask as dry, distilled dimethyl formamide was added in sufficient amount to give a 20% solids solution. As the reaction proceeded, the temperature of the solution rose to about 75° C. and a considerable increase in viscosity occurred. The resulting polyamide-acid was a white polymer having an inherent viscosity of 0.33 (when measured as a 0.5% solution in N,N-dimethylacetamide at 30° C.). The reaction mixture containing the polyamide-acid in the dimethylformamide was cast onto a glass plate and dried at 50° C. to produce a clear, tough film of the polyamide-acid.

EXAMPLES 33–35

When the procedure of Example 1, wherein the diamine is first dissolved in N,N-dimethylacetamide and the dianhydride is stirred portion-wise into the solution, is repeated using the following combinations of diamines and dianhydrides, the corresponding polyamide-acid is obtained in each case.

In Example 33, 0.035 mole of 4,4'-diamino-diphenyl sulfide and 0.035 mole of 3,4-dicarboxyphenyl sulfone dianhydride are used. In Example 34, 0.05 mole of 4,4'-diamino-diphenyl ether and 0.05 mole of 2,3,5,6-pyrazine tetracarboxylic dianhydride are used. In Example 35, 0.0035 mole of 4,4'-diamino-diphenyl ether and 0.0035 mole of bis(3,4-dicarboxyphenyl) ether dianhydride are used. The inherent viscosities of the polyamide-acids are all substantially above 0.1 (when measured as a 0.5% solution in N,N-dimethylacetamide at 30° C.). The viscous solutions may be cast on glass plates and dried to form tough, flexible polyamide-acid films.

EXAMPLE 36

This example illustrates the importance of temperature and its relationship to the duration of the reaction in providing polymeric compositions within the definition of the present invention. For this example, a solution of twenty grams (0.1 mole) of 4,4'-diamino-diphenyl ether in 120 milliliters of N,N-dimethylacetamide was prepared. A solution of 21.7 grams (0.1 mole) of pyromellitic dianhydride in 250 milliliters of N,N-dimethylacetamide was also prepared and added rapidly to the diamine solution. The temperature of the reaction and the reaction time was varied as shown in the following table to provide a polymeric composition containing at least 50% polyamide-acid. The inherent viscosities of the polymers (as measured as 0.5% solution in N,N-dimethylacetamide at 30° C.) are also given in the table.

*Table for Example 36*

| Experiment | Temperature (° C.) | Time (minutes) | Inherent viscosity |
|---|---|---|---|
| A | 25–45 | 120 | 3.15 |
| B | 85–88 | 30 | 2.44 |
| C | 115–119 | 15 | 1.16 |
| D | 125–128 | 15 | 1.00 |
| E | 165–166 | 3–4 | 0.89 |

EXAMPLE 37

Example 36 was repeated using N-methylcaprolactam as the solvent instead of N,N-dimethylacetamide. It was observed that when the temperature of the reaction between the 4,4'-diamino-diphenyl ether and the pyromellitic dianhydride was maintained between 150–160° C. for 2 minutes, the inherent viscosity (as measured as a 0.5% solution in N,N-dimethylacetamide at 30° C.) of the resulting polymeric component containing predominantly polyamide-acid, after being isolated and redissolved, was 0.51. When the temperature was permitted to rise to 175° C., an inherent viscosity greater than 0.1 could only be obtained if the reaction period were reduced to 0.5 minute.

EXAMPLE 38

The surfaces of pieces of aluminum, brass, copper, cast iron, titanium and zinc (as galvanized coating on iron) were cleaned by rubbing lightly with emory cloth and rinsing with trichloroethylene. Then the surfaces were coated with a 12% solution of a polyamide-acid in N,N-dimethylformamide. The polyamide-acid had been made from 4,4'-diamino-diphenyl methane and pyromellitic dianhydride as in Example 8. The samples were dried in an air oven at 120° C. for 15 minutes producing coatings of polyamide-acid film which were 1 mil thick. These films adhered well to the metals, and were converted to the corresponding polyimide by baking in a vacuum oven at 300° C. for 0.5 hour.

EXAMPLE 39

Two solutions were sprayed simultaneously from two spray guns onto an untreated plywood panel. The first solution consisted of a 6% solids solution in N,N-dimethylacetamide of a polyamide-acid made from pyromellitic dianhydride and 4,4'-diamino-diphenyl ether using the method of Example 26. The second consisted of a mixture of 5 volumes of acetic anhydride, 3 volumes of pyridine and 2 volumes of triethylamine. After the desired thickness (about 5 mils) of polyamide-acid coating had been reached, the panel was dried in air for several days at room temperature, and then extracted by immersion in benzene and dried under vacuum at 50° C. for 1 hour. This produced an attractive polyimide finish resembling commercial wood finishes.

EXAMPLE 40

By the procedure of Example 39 (the spray gun technique), the following substrates were coated with the polyamide-acid prepared by the method of Example 26: polyvinyl fluoride film, polyethylene terephthalate film, a polyurethane foam, polystyrene foam, polyvinyl chloride foam, woven cotton fabric, metallized films of polyethylene terephthalate and of polyvinyl fluoride, stainless steel, iron and a sheet of polymethylmethacrylate. The ultimate polyimide coatings adhered well as in Example 39.

EXAMPLES 41–44

Films of oriented linear polyethylene, branched polyethylene, oriented linear polypropylene and a tetrafluoroethylene/hexafluoropropylene copolymer were first treated with an electrical discharge to improve surface adherability. They were then coated by solvent-casting a solution in N,N-dimethylacetamide of polyamide-acid having inherent viscosities of 2.0 and 1.0 which had been made from pyromellitic dianhydride and 4,4'-diamino-diphenyl ether. The polyamide-acid had been prepared using a procedure similar to that in Example 26. Films with 0.1, 0.5 and 1.0 mil coatings were prepared. Adhesion was good in all cases. The coatings were converted to polyimide coatings by treatment with acetic anhydride and pyridine, followed by solvent removal in a vacuum oven at 100° C.

EXAMPLE 45

The polyamide-acid solutions of the previous example were used to coat films of polyethylene terephthalate and cellophane, and non-woven mats of fibrous polyethylene and polypropylene. In every case adhesion of the polyamide-acid was satisfactory.

EXAMPLE 46

Twenty twists of No. 18 copper wire were first annealed for 30 minutes at 150° C. and then dipped in a 14% solution of polyamide-acid, solution viscosity about 20 poises. The polyamide-acid had been prepared from pyromellitic dianhydride and 4,4'-diamino-diphenyl ether in N,N-dimethylacetamide/N-methyl-2-pyrrolidone/toluene using a procedure similar to that of Example 26. The wires were removed from the solution, allowed to drain and then baked 2 hours at 100° C. followed by 1 hour at 190° C. The dipping and baking procedure was repeated and then a final bake of 16 hours at 250° C. was given to provide wires coated with the corresponding polyimide.

EXAMPLE 47

A polyamide-acid of 4,4'-diamino-diphenyl ether and pyromellitic dianhydride was prepared substantially as in Example 26 using as the solvent a blend of N,N-dimethylacetamide/toluene/N-methyl-2-pyrrolidone—1.75/1.75/1. The solution was adjusted to 13.5% solids. The viscosity of this solution was about 100–110 centipoises.

The coating was then applied by a dip technique to a 2-mil thick woven glass fabric. The coated material was drawn through an 8 foot drying tower with a temperature gradient of 100–170° C. After drying, the material was drawn vertically through the tower with the temperature gradient raised to 150–375° C. Three such coating and conversion cycles were necessary to produce the desired thickness of 3–3.5 mils of the fabric coated with the poly bis(4-aminophenyl) ether pyromellitimide.

A non-woven glass yarn is sized with the above coating solution, followed by drying and baking under the same conditions mentioned above. This is woven into a fabric having substantially the same properties as the impregnated woven fabric except that the interstices are not filled and the fabric is less stiff.

What is claimed is:

1. A shapeable polymeric composition consisting essentially of at least one polyamide-acid having the formula:

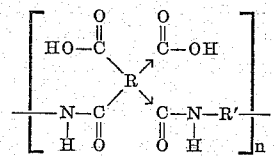

wherein → denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1; dissolved in an organic solvent.

2. A polyamide-acid as in claim 11 wherein R contains at least 6 carbon atoms in a ring structure characterized by benzenoid unsaturation, the 4 carbonyl groups of each polyamide-acid unit being each attached to separate carbon atoms and wherein each pair of carbonyl groups is directly attached to adjacent carbon atoms in the R radical.

3. A polyamide-acid as in claim 11 wherein R' contains at least 6 carbon atoms in a ring structure characterized by benzenoid unsaturation.

4. A polyamide-acid as in claim 11 wherein R is derived from dianhydrides of the group consisting of pyromellitic dianhydride; 2,2-bis(3,4-dicarboxy phenyl) propane dianhydride; and bis(3,4-dicarboxy phenyl) ether dianhydride.

5. A polyamide-acid as in claim 11 wherein R' is derived from diamines selected from the group consisting of meta-phenylene diamine, paraphenylene diamine, benzidine, 4,4'-diamino-diphenyl propane, 4,4'-diamino-diphenyl methane, 4,4'-diamino-diphenyl ether, 4,4'-diamino-diphenyl sulfone, 4,4'-diamino-diphenyl sulfide, hexamethylene diamine, 4,4'-dimethyl heptamethylene diamine and 2,11-dodecane diamine.

6. A shapeable polymeric composition consisting essentially of 0.5–40% by weight of at least one polyamide-acid having the formula:

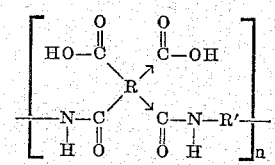

wherein → denotes isomerism; wherein R is a tetravalent organic radical containing at least 2 carbon atoms, no more thna 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and n is an integer sufficient to provide polyamide-acid with an inherent viscosity of at least 0.1; dissolved in at least 60% of an organic solvent.

7. A polyamide-acid as in claim 11 wherein R contains at least 6 carbon atoms in a ring structure characterized by benzenoid unsaturation, the 4 carbonyl groups of each polyamide-acid unit being each attached to separate carbon atoms.

8. The shapeable polymeric composition of claim 6 wherein the organic solvent is an N,N-dialkylcarboxyl amide.

9. The shapeable polymeric composition of claim 6 wherein the organic solvent is N,N-dimethylformamide.

10. The shapeable polmeric composition of claim 6 wherein the organic solvent is N,N-dimethylacetamide.

11. A polyamide-acid having the formula:

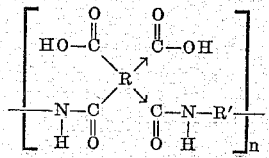

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of said adjacent polyamide-acid units each attached to separate carbon atoms of said divalent radical; and wherein n is an integer sufficient to provide an inherent viscosity of at least 0.1.

12. A shaped article consisting essentially of at least one polyamide-acid having the formula:

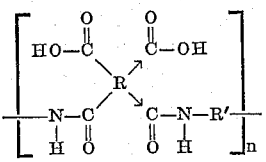

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

13. A filament consisting essentially of at least one polyamide-acid having the formula:

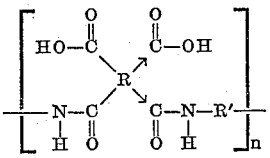

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

14. A self-supporting film consisting essentially of at least one polyamide-acid having the formula:

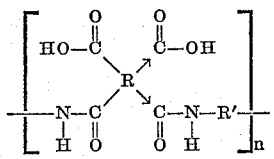

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

15. A substrate coated with a polymeric composition consisting essentially of at least one polyamide-acid having the formula:

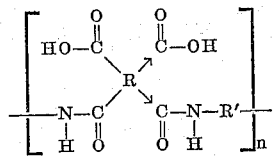

wherein → denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

16. A metal coated with a polymeric composition consisting essentially of at least one polyamide-acid having the formula:

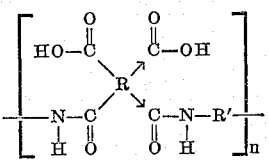

wherein → denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

17. A metal wire coated with a polymeric composition consisting essentially of at least one polyamide-acid having the formula:

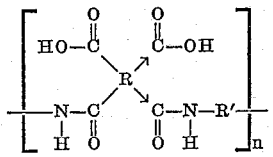

wherein → denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

18. A self-supporting polymeric film coated with a polymeric composition consisting essentially of at least one polyamide-acid having the formula:

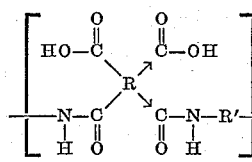

wherein → denotes isomerism; wherein R is an organic tetravalent radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and wherein n is an integer sufficient to provide said polyamide-acid with an inherent viscosity of at least 0.1.

19. A process for coating a substrate which consists essentially of applying a polymeric composition of 0.5–40% by weight of at least one polyamide-acid having the formula:

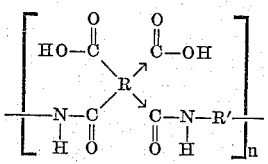

wherein → denotes isomerism; wherein R is a tetravalent organic radical containing at least 2 carbon atoms, no more than 2 carbonyl groups of each polyamide-acid unit being attached to any one carbon atom of said tetravalent radical; wherein R' is a divalent radical containing at least 2 carbon atoms, the amide groups of adjacent polyamide-acid units each attached to separate carbon atoms of said divalent radical; and n is an integer sufficient to provide polyamide-acid with an inherent viscosity of at least 0.1; dissolved in at least 60% of an organic solvent and, thereafter, removing the solvent.

20. A process for preparing a shapeable polymeric composition consisting essentially of reacting at least one diamine having the structural formula:

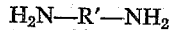

wherein R' is a divalent radical containing at least 2 carbon atoms, the two amino groups of said diamine each attached to separate carbon atoms of said divalent radical; with at least one tetracarboxylic acid dianhydride having the structural formula:

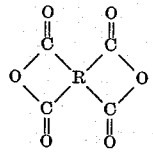

wherein R is a tetravalent organic radical containing at least 2 carbon atoms, no more than 2 carbonyl groups of said dianhydride attached to any one carbon atom of said tetravalent radical, the molar amount of said diamine being no greater than a 5% excess over the molar amount of said dianhydride and the molar amount of said dianhydride being no greater than a 5% excess over the molar amount of said diamine; in an organic solvent for at least one of said diamine and dianhydride reactants, said solvent being substantially inert to said diamine and dianhydride reactants, for a time and at a temperature sufficient to provide a polymer composed of at least 50% of the corresponding polyamide-acid.

21. The process of claim 20 wherein the organic solvent is selected from the group consisting of N,N-dimethylformamide, N,N-dimethylacetamide, N,N-diethylformamide, N,N - diethylacetamide, N,N - dimethylmethoxy acetamide, N - methyl caprolactam, dimethylsulfoxide, N-methyl-2-pyrrolidone, tetramethylene urea, pyridine, dimethylsulfone, hexamethylphosphoramide, tetramethylene sulfone, formamide and N-methylformamide.

22. The process of claim 20 wherein R' of the diamine contains at least 6 carbon atoms in a ring structure characterized by benzenoid unsaturation.

23. The process of claim 20 wherein the diamine is selected from the group consisting of meta-phenylene diamine, para-phenylene diamine, benzidine, 4,4'-diaminodiphenyl propane, 4,4'-diamino-diphenyl methane, 4,4'-diamino-diphenyl ether, 4,4'-diamino-diphenyl sulfone, 4,4'-diamino-diphenyl sulfide, hexamethylene diamine, 4,4'-dimethyl heptamethylene diamine and 2,11-dodecane diamine.

24. The process of claim 20 wherein R of the dianhydride contains at least 6 carbon atoms in a ring structure characterized by benzenoid unsaturation, the 4 carbonyl groups of each polyamide-acid unit being each attached to separate carbon atoms and wherein each pair of carbonyl groups is directly attached to adjacent carbon atoms in the R radical to provide a 5-membered ring.

25. The process of claim 20 wherein the dianhydride is selected from the group consisting of pyromellitic dianhydride, 2,2-bis(3',4'-dicarboxy phenyl) propane dianhydride and bis(3,4-dicarboxyl phenyl) ether dianhydride.

References Cited by the Examiner
UNITED STATES PATENTS 2,404,714 7/46 Latham _____ 260—32.6
2,703,317 3/55 D'Alelio _____ 260—32.6
2,710,853 6/55 Edwards et al. _____ 260—78

MORRIS LIEBMAN, Primary Examiner.
LEON J. BERCOVITZ, Examiner.